United States Patent
Eilenberger et al.

(10) Patent No.: US 7,031,616 B2
(45) Date of Patent: Apr. 18, 2006

(54) MONITORING UNIT FOR OPTICAL BURST MODE SIGNALS

(75) Inventors: Gert Eilenberger, Kirchheim (DE); Uwe Bigalk, Leutenbach (DE)

(73) Assignee: Alcatel, Paris (FR)

( * ) Notice: Subject to any disclaimer, the term of this patent is extended or adjusted under 35 U.S.C. 154(b) by 603 days.

(21) Appl. No.: 10/194,049

(22) Filed: Jul. 15, 2002

(65) Prior Publication Data
US 2003/0016412 A1    Jan. 23, 2003

(30) Foreign Application Priority Data
Jul. 17, 2001    (EP) .................................. 01440225

(51) Int. Cl.
*H04B 10/08* (2006.01)

(52) U.S. Cl. ...................... 398/155; 398/154; 398/202; 398/210

(58) Field of Classification Search .............. 398/182, 398/200, 26, 28, 154, 155, 202, 210, 5; 375/326, 375/327, 359, 355; 714/622; 327/231; 356/477
See application file for complete search history.

(56) References Cited

U.S. PATENT DOCUMENTS

| | | | |
|---|---|---|---|
| 5,040,194 A | * | 8/1991 | Tjahjadi et al. ............. 375/345 |
| 5,365,516 A | * | 11/1994 | Jandrell ....................... 370/335 |
| 5,585,954 A | | 12/1996 | Taga et al. |
| 5,617,237 A | | 4/1997 | Bogdan et al. |

FOREIGN PATENT DOCUMENTS

| | | |
|---|---|---|
| EP | 0999670 A2 | 5/2000 |
| WO | WO 0120452 A1 | 3/2001 |

* cited by examiner

*Primary Examiner*—David C. Payne
(74) *Attorney, Agent, or Firm*—Sughrue Mion, PLLC

(57) ABSTRACT

The invention has for its object to provide a monitoring unit, particularly for optical burst mode signals in asynchronous optical networks based on, e.g., Internet or ATM (ATM=asynchronous transfer mode). The monitoring unit for burst mode signals comprises a detector for performing a Q-factor measurement in dependence on at least one variable and at least one fixed amplitude threshold value and on at lest one variable and at least one fixed phase value. This detector contains a burst mode amplitude detector for generating a fixed amplitude threshold value for each burst, a burst mode clock recovery circuit for generating a fixed phase value for each burst, a burst detector for detecting the beginning of each burst, and a control logic for generating a variable amplitude threshold value and a variable phase value for each burst.

5 Claims, 1 Drawing Sheet

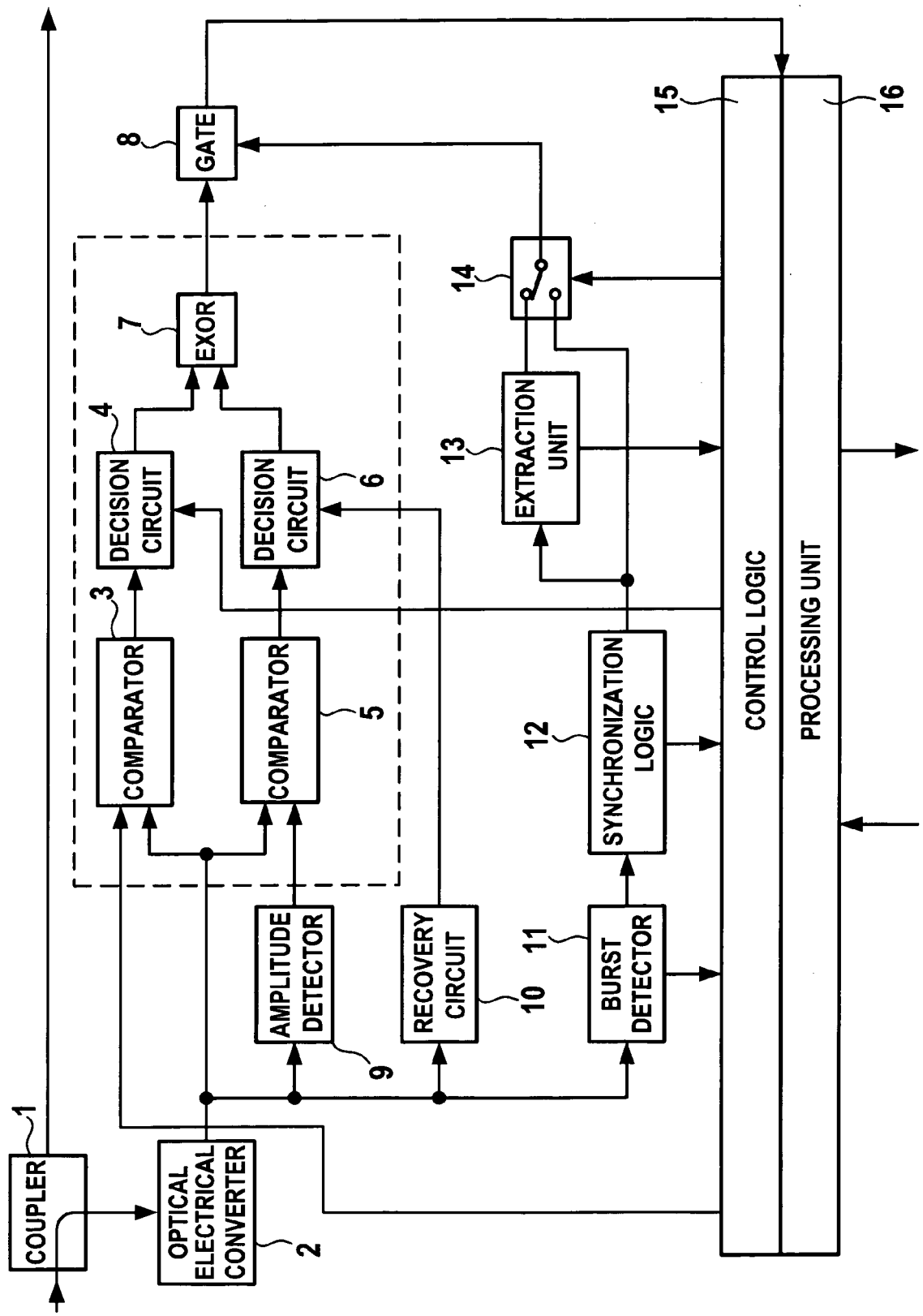

MONITORING UNIT FOR OPTICAL BURST MODE SIGNALS

TECHNICAL FIELD

This invention relates to a monitoring unit, particularly for optical burst mode signals.

The invention is based on a priority application EP 01 440 225.9

BACKGROUND OF THE INVENTION

To determine the performance of a synchronous optical network, such as a DWDM-SDH/SONET network, it is known to measure the signal quality of optical links during operation by observing the amplitude and phase distribution of the optical signal and derive an estimate of the bit error rate therefrom; DWDM=dense wavelength division multiplexing, SDH=synchronous digital hierarchy, SONET=synchronous optical network. To this end, a Q-factor measurement is performed, which directly reflects the quality of the optical signal; Q stands for the error integral. Q is obtained by observing the amplitude and phase characteristic of the analog signal at the electrical level. The method is based on nonuniform sampling to simulate a poor signal-to-noise ratio and an increased bit error rate. The Q factor, which corresponds to the conditions with optimum sampling, can than be determined using statistical methods. The principle of the Q-factor meter is based on random sampling of the eye pattern. In a two-way detector, one comparator operates as a center sampler with a fixed amplitude threshold and fixed phased position, while another comparator operates as a measuring sampler and can vary these two parameters. The outputs of the two comparators are compared by an exclusive-OR gate, and differences are counted as bit errors. The method is limited to synchronous, continuous-time signals with a stable, previously known sampling clock phase.

SUMMARY OF THE INVENTION

The invention has for its object to provide a monitoring unit, particularly for optical burst mode signals in asynchronous optical networks based on, e.g., Internet or ATM (ATM=asynchronous transfer mode).

This object is attained by a monitoring unit for burst mode signals, comprising a detector for performing a Q-factor measurement in dependence on at least one variable and at least one fixed amplitude threshold value and on at least one variable and at least one fixed phase value, said detector comprising a burst mode amplitude detector for generating a fixed amplitude threshold value for each burst mode signal to be included in the measurement, a burst mode clock recovery circuit for generating a fixed phase value for each burst mode signal to be included in the measurement, a burst detector for detecting the respective beginnings of burst mode signals, and a control logic for generating a variable amplitude threshold value and a variable phase value for each burst mode signal to be included in the measurement.

The monitoring unit, which may also be called a measuring circuit, has to monitor optical bursts of fixed and/or variable length. The individual bursts are separated by so-called guard bonds. From burst to burst, signal level variations in the range of several dB may occur. In addition, the clock frequency and the phase position may vary from burst to burst. Each burst has a short, predefined preamble to permit clock and amplitude recovery. The circuit according to the invention permits scaling of the burst mode signal amplitude to be measured. It further permits very fast burst mode clock recovery which allows the measurement to be adjusted to the current burst. The circuit also permits a start-of-burst detection which provides a coarse determination of the start time of a current burst based on the detection of the guard band. In a subsequent burst synchronization logic, a fine determination of the start of the burst payload is made.

A basic idea of the invention is to synchronize each received burst and determine for each burst a variable and a fixed amplitude threshold value as well as a variable and a fixed phase value. Instead of including each burst in the Q-factor measurement, it is also possible to synchronize only part of the bursts and determine the corresponding values. The number of bursts included in the measurement can be selected at equidistant intervals, e.g., each, every second, every third burst, or for instance at irregular intervals, for example by means of a random generator. The invention is not limited to the monitoring of optical bursts but can just as well be used to monitor electric bursts.

The error signal resulting from the comparisons between the amplitude threshold values and the phase values is passed or blocked by a gate. The gate is controlled by the synchronization logic in such a way that only the payload information of the burst data stream is used for the pseudo-error measurement. By software-based processing, an extrapolation to the current bit error rate is performed. Thus, signal degradations can be detected at an early stage.

In an advantageous development of the invention, the header and control information of each burst is monitored and processed at least in part. In addition to the Q-factor measurement of the overall burst data stream, the header and control information is used to distinguish between specific burst flows or label switched paths. The latter include specific header information, the labels. The inclusion of header and/or control information permits the measurement of specific selected burst data streams, e.g., flows, connections, label switched paths, with the possibility of tracing such burst streams throughout the network.

IP based optical networks and optical terabit routing nodes are of particular interest to the telecommunications and data industries. The present invention provides a performance monitoring scheme which can be used at any point of the network or node, particularly in an optical transparency domain, to monitor burst mode signals without specific previous knowledge of the transport protocol used.

BEST MODE FOR CARRYING OUT THE INVENTION

An embodiment of the invention will now be explained with reference to the accompanying drawing.

The single FIGURE of the drawing shows a monitoring unit for optical burst mode signals in accordance with the invention.

Optical networks are increasingly based on asynchronous, packet-oriented networks, such as ATM or Internet. In such optical networks, signal-level, clock-frequency, and phase variations may occur from burst to burst. The monitoring unit takes into account these possible variations in the Q-factor measurement, i.e., in a signal quality measurement, and performs a separate measurement for each burst. To this end, each burst is synchronized and four parameters are measured for each burst. The measured parameters comprise a variable amplitude threshold value, a fixed amplitude threshold value, a variable phase value, and a fixed phase value. The eye diagram is evaluated in the case of varying amplitude threshold values and sampling clock phases. In this manner, a pseudoerror measurement is performed. The Q factor and the current bit error rate are extrapolated and estimated on the basis of the measured values. The actual bit error measurement on a data signal, however, is then made at the end of a transmission path through the network in a receiver taking into account decoding, e.g., Viterbi decoder, error correction, etc.; such a receiver does not form part of the monitoring unit described herein.

The monitoring unit comprises a detector for performing a Q-factor measurement in dependence on at least one variable and at least one fixed amplitude threshold value and on at least one variable and at least one fixed phase value which contains a burst mode amplitude detector 9 for generating a fixed amplitude threshold value for each burst, a burst mode clock recovery circuit 10 for generating a fixed phase value for each burst, a burst detector 11 for detecting the beginning of a burst, and a control logic 15 for generating a variable amplitude threshold value and a variable phase value for each burst.

The monitoring unit is connected via an asymmetric optical coupler 1 to an optical line. The optical line is, for instance, a glass optical fiber line on which optical burst mode signals are transported, for example, in an optical, IP based network; IP=Internet Protocol. Optical coupler 1 taps off 10% of the level of the received signals, for example and transfers them to an optical-to-electrical converter 2; the remaining 90% are transferred, for example, to an optical receiver for data evaluation.

In the optical-to-electrical converter 2, the received optical burst mode signals are converted to electric signals which are then fed to five components, namely to a first comparator 3, a second comparator 5, the burst mode amplitude detector 9, the burst mode clock recovery circuit 10, and the burst detector 11.

Comparator 3 compares the amplitudes of the electric signal with variable amplitude thresholds. For each burst, a new variable amplitude threshold is determined.

Comparator 5 compares the amplitudes of the electric signal with fixed amplitude thresholds. For each burst, a new fixed amplitude threshold is determined. The determination is made in amplitude detector 9, which selects an average value, for instance in the form of a fixed threshold voltage.

Comparator 3 is followed by a decision circuit 4. In decision circuit 4, the output signal provided by comparator 3 is sampled in dependence on a variable phase. For each burst, a new variable phase value is determined.

Thus, for each burst, a variable amplitude threshold value and a variable phase value enter into the output signal of the decision circuit.

Comparator 5 is followed by a decision circuit 6. In decision circuit 6, the output signal provided by comparator 5 is sampled in dependence on a fixed phase. For each burst, a new fixed phase value is determined. Thus, for each burst, a fixed amplitude threshold value and a fixed phase value enter into the output signal of the decision circuit. The fixed phase value is determined in burst mode clock recovery circuit 10, which selects an average value of a fixed phase from the sampling clock.

Decision circuits 4 and 6 are connected via an EXOR 7 to a gate 8.

Gate 8 provides an error signal which is fed to a processing unit 16. Processing unit 16 is, for example, a suitably programmed microprocessor. It is fed with control data for computing the extrapolation and estimate. From the error signal and the control data, processing unit 16 determines an estimate of the Q factor, which is provided at an output and used to monitor and control the network, e.g., to readjust the signal power at the transmitting end or to reconfigure the network if the signal quality of the respective path being monitored falls below specified limit values.

Burst detector 11 serves to detect the beginning of a burst. The start-of-burst detection provides a coarse determination of the start time of a current burst based on the detection of the guard band. This start-of-burst information is made available to control logic 15 and to a burst synchronization logic 12 which makes a fine determination of the start of the burst payload. This start-of-payload information is made available to control logic 15. From the start-of-burst and start-of-payload information and from further information received from processing unit 16 and relating to the eye diagram, control logic 15 generates a variable amplitude threshold value and a variable phase value for each burst. Control logic 15 is implemented as a suitably programmed microprocessor, for example. Control logic 15 and processing unit 16 may also be implemented together on a microprocessor, digital signal processor, FPGA, or the like, and have at least one data interface for the exchange of data.

The start-of-payload information is also fed to an extraction unit 13 and a switch 14.

Extraction unit 13 serves to extract the header and/or control information. The header information and/or control information serves to selectively measure specific bursts and is transferred to switch 14 and control logic 15.

Switch 14 is controlled by control logic 15, which selects which variant of the measure is to be performed: a general Q-factor measurement for all bursts or a selective Q-factor measurement for specific bursts. For the first variant, the start-of-payload information is transferred as a control signal to gate 8, and for the second variant, the header information is transferred. For the second variant, the variable amplitude threshold values and the variable phase values are additionally determined based on the header information.

Extraction unit 13 and switch 14 are optional. If no selective Q-factor measurement or no estimate of specific bursts is required, they can be replaced by a direct connection from the output of burst synchronization logic 12 to the control input of gate 8.

The invention claimed is:

1. A monitoring unit for monitoring optical burst mode signals, the monitoring unit comprising:
    a detector for performing a Q-factor measurement with regard to the optical burst mode signals based on at least one variable amplitude threshold value, at least one fixed amplitude threshold values, at least one variable phase value and at least one fixed phase value, said detector comprising:
    a burst mode amplitude detector for generating a fixed amplitude threshold value for each optical burst mode signal to be included in the measurement,
    a burst mode clock recovery circuit for generating a fixed phase value for each optical burst mode signal to be included in the measurement,
    a burst detector for detecting respective beginnings of the burst mode signals, and
    a control logic for generating the variable amplitude threshold value and the variable phase value for each optical burst mode signal to be included in the measurement.

2. The monitoring unit as set forth in claim 1, wherein the detector further comprises:

a first comparator for comparing the optical burst mode signals with associated variable amplitude threshold values generated by the control logic, a second comparator for comparing the optical burst mode signals with associated fixed amplitude threshold values generated by the burst mode amplitude detector, a first decision circuit, for passing on output signals of the first comparator based on variable phase values generated by the control logic, a second decision circuit, for passing on output signals of the second comparator based on fixed phase values generated by the burst mode clock recovery circuit, and an EXOR gate for combining output signals of the first and second decision circuits.

3. The monitoring unit as set forth in claim 2, wherein the detector further comprises:

a burst synchronization logic for receiving an output of the burst detector and determining respective beginnings of payloads of the optical burst mode signals, and a gate for receiving an output of the EXOR gate and controlled by the burst synchronization logic for passing error signals to a processing unit which estimates a Q factor.

4. The monitoring unit as set forth in claim 3, wherein the detector further comprises:

an extraction unit for receiving an output of the burst synchronization logic and extracting header or control information for selective measurement of specific burst mode control signals, and a switch which is connected between the extraction unit, the burst synchronization logic, and the gate, and is controlled by the control logic.

5. The monitoring unit as set forth in claim 1, further comprising an optical-to-electrical converter for converting the optical burst mode signals to electric input signals for the burst mode amplitude detector, the burst mode clock recovery circuit, and the burst detector.

* * * * *